(12) United States Patent
Ahmad et al.

(10) Patent No.: US 9,471,395 B2
(45) Date of Patent: Oct. 18, 2016

(54) PROCESSOR CLUSTER MIGRATION TECHNIQUES (75) Inventors: Sagheer Ahmad, Cupertino, CA (US); Shailender Chaudhry, Sunnyvale, CA (US); John George Mathieson, San Jose, CA (US); Mark Alan Overby, Bothell, WA (US)

(73) Assignee: NVIDIA Corporation, Santa Clara, CA (US)

( * ) Notice: Subject to any disclaimer, the term of this patent is extended or adjusted under 35 U.S.C. 154(b) by 172 days.

(21) Appl. No.: 13/592,748

(22) Filed: Aug. 23, 2012

(65) Prior Publication Data
US 2014/0059548 A1 Feb. 27, 2014

(51) Int. Cl.
G06F 9/46 (2006.01)
G06F 9/50 (2006.01)

(52) U.S. Cl.
CPC ........... *G06F 9/5094* (2013.01); *G06F 9/5088* (2013.01); *G06F 2209/5019* (2013.01); *G06F 2209/5022* (2013.01); *Y02B 60/142* (2013.01); *Y02B 60/162* (2013.01)

(58) Field of Classification Search
USPC ................................. 713/320, 324; 718/713
See application file for complete search history.

(56) References Cited

U.S. PATENT DOCUMENTS

| | | |
|---|---|---|
| 2,800,621 A | 7/1957 | Carlson et al. |
| 4,868,832 A | 9/1989 | Marrington et al. |
| 5,220,660 A | 6/1993 | Yoshizawa et al. |
| 5,339,445 A | 8/1994 | Gasztonyi |
| 5,471,189 A | 11/1995 | Dietz et al. |
| 5,510,740 A | 4/1996 | Farrell et al. |
| 5,517,441 A | 5/1996 | Dietz et al. |
| 5,530,845 A | 6/1996 | Hiatt et al. |
| 5,586,308 A | 12/1996 | Hawkins et al. |
| 5,588,099 A | 12/1996 | Mogilevsky et al. |
| 5,649,222 A | 7/1997 | Mogilevsky |
| 5,659,687 A | 8/1997 | Kim et al. |
| 5,687,382 A | 11/1997 | Kojima et al. |
| 5,737,613 A | 4/1998 | Mensch, Jr. |
| 5,758,133 A | 5/1998 | Envoy |
| 5,862,368 A | 1/1999 | Miller et al. |
| 5,889,529 A | 3/1999 | Jones et al. |
| 6,029,170 A | 2/2000 | Garger et al. |
| 6,040,845 A | 3/2000 | Melo et al. |
| 6,061,679 A | 5/2000 | Bournas et al. |
| 6,134,167 A | 10/2000 | Atkinson |

(Continued)

FOREIGN PATENT DOCUMENTS

| | | |
|---|---|---|
| GB | 2457170 | 8/2009 |
| WO | 20040102623 | 11/2004 |

OTHER PUBLICATIONS

Herzer, et al.; Capacitive-Coupled Current Sensing and Auto-Ranging Slope Compensation for Current Mode SMPS With Wide Supply and Frequency Range; IEEE; ESSCIRC; Sep. 2009; pp. 140-143; Texas Instruments; Freising, Germany.

(Continued)

*Primary Examiner* — Diem Cao (57) ABSTRACT

Embodiments of the present technology provide for migrating processes executing one any one of a plurality of cores in a multi-core cluster to a core of a separate cluster without first having to transfer the processes to a predetermined core of the multi-core cluster. Similarly, the processes may be transferred from the core of the separate cluster to the given core of the multi-core cluster.

20 Claims, 8 Drawing Sheets

(56) References Cited

U.S. PATENT DOCUMENTS

| | | | |
|---|---|---|---|
| 6,163,583 A | 12/2000 | Lin et al. | |
| 6,169,546 B1 | 1/2001 | Bogdan | |
| 6,169,984 B1 | 1/2001 | Bogdan | |
| 6,191,969 B1 | 2/2001 | Pereira | |
| 6,191,970 B1 | 2/2001 | Pereira | |
| 6,212,645 B1 | 4/2001 | Tjandrasuwita | |
| 6,216,234 B1 | 4/2001 | Sager et al. | |
| 6,243,280 B1 | 6/2001 | Wong et al. | |
| 6,249,284 B1 | 6/2001 | Bogdan | |
| 6,380,764 B1 | 4/2002 | Katoh et al. | |
| 6,397,340 B2 | 5/2002 | Watts, Jr. et al. | |
| 6,493,856 B2 | 12/2002 | Usami et al. | |
| 6,538,947 B2 | 3/2003 | Ahmed et al. | |
| 6,584,003 B1 | 6/2003 | Kim et al. | |
| 6,600,575 B1 | 7/2003 | Kohara | |
| 6,678,831 B1 | 1/2004 | Mustafa et al. | |
| 6,728,959 B1 | 4/2004 | Merkey | |
| 6,754,837 B1 | 6/2004 | Helms | |
| 6,762,768 B2 | 7/2004 | Dilliplane | |
| 6,768,659 B2 | 7/2004 | Gillingham et al. | |
| 6,775,776 B1 | 8/2004 | Vogt et al. | |
| 6,804,267 B1 | 10/2004 | Long et al. | |
| 6,816,809 B2 | 11/2004 | Circenis | |
| 6,845,456 B1 | 1/2005 | Menezes et al. | |
| 6,901,298 B1 | 5/2005 | Govindaraj et al. | |
| 6,909,266 B2 | 6/2005 | Kernahan et al. | |
| 6,990,594 B2 | 1/2006 | Kim | |
| 7,007,247 B1 | 2/2006 | Wang et al. | |
| 7,043,649 B2 | 5/2006 | Terrell, II | |
| 7,058,834 B2 | 6/2006 | Woods et al. | |
| 7,100,013 B1 | 8/2006 | de Waal | |
| 7,138,815 B1 | 11/2006 | Alexander et al. | |
| 7,174,472 B2 | 2/2007 | Hill | |
| 7,187,205 B2 | 3/2007 | Ramaraju et al. | |
| 7,256,232 B2 | 8/2007 | Lamaze et al. | |
| 7,414,550 B1 | 8/2008 | Sudharsanan | |
| 7,434,072 B2 | 10/2008 | Peirson et al. | |
| 7,518,399 B1 | 4/2009 | Santurkar et al. | |
| 7,529,958 B2 | 5/2009 | Roth et al. | |
| 7,590,815 B1 | 9/2009 | de Waal | |
| 7,624,215 B2 | 11/2009 | Axford et al. | |
| 7,730,248 B2 | 6/2010 | Goss et al. | |
| 7,739,533 B2 | 6/2010 | Rauschmayer et al. | |
| 7,849,332 B1 | 12/2010 | Alben et al. | |
| 7,945,875 B2 | 5/2011 | Anand et al. | |
| 7,954,078 B1 | 5/2011 | Wang et al. | |
| 8,296,773 B2 * | 10/2012 | Bose et al. | 718/105 |
| 8,327,173 B2 | 12/2012 | Hendin et al. | |
| 8,949,645 B2 | 2/2015 | Ahmad et al. | |
| 2001/0044909 A1 | 11/2001 | Oh et al. | |
| 2002/0126751 A1 | 9/2002 | Scheurich et al. | |
| 2002/0172008 A1 | 11/2002 | Michael | |
| 2003/0004921 A1 | 1/2003 | Schroeder | |
| 2003/0023825 A1 | 1/2003 | Woo et al. | |
| 2003/0204757 A1 | 10/2003 | Flynn | |
| 2003/0204761 A1 | 10/2003 | D'Alessio | |
| 2003/0206164 A1 | 11/2003 | Juenger | |
| 2003/0233525 A1 | 12/2003 | Reeves | |
| 2004/0076062 A1 | 4/2004 | Ueda et al. | |
| 2004/0095119 A1 | 5/2004 | Kernahan et al. | |
| 2005/0015321 A1 | 1/2005 | Vindekilde | |
| 2005/0050373 A1 * | 3/2005 | Orenstien et al. | 713/320 |
| 2005/0125705 A1 | 6/2005 | Cheng et al. | |
| 2005/0218943 A1 | 10/2005 | Padhye et al. | |
| 2006/0170402 A1 | 8/2006 | Banerjee et al. | |
| 2006/0184808 A1 | 8/2006 | Chua-Eoan et al. | |
| 2006/0226895 A1 | 10/2006 | Hoshi et al. | |
| 2007/0206018 A1 | 9/2007 | Bajic et al. | |
| 2008/0016383 A1 | 1/2008 | Watanabe et al. | |
| 2008/0247241 A1 | 10/2008 | Nguyen et al. | |
| 2008/0288748 A1 * | 11/2008 | Sutardja et al. | 712/20 |
| 2008/0307240 A1 | 12/2008 | Dahan et al. | |
| 2008/0307244 A1 * | 12/2008 | Bertelsen et al. | 713/323 |
| 2009/0049220 A1 | 2/2009 | Conti et al. | |
| 2009/0054075 A1 | 2/2009 | Boejer et al. | |
| 2009/0091186 A1 | 4/2009 | Clemo et al. | |
| 2009/0201082 A1 | 8/2009 | Smith et al. | |
| 2009/0204831 A1 | 8/2009 | Cousson et al. | |
| 2009/0210831 A1 | 8/2009 | Correale et al. | |
| 2009/0222654 A1 * | 9/2009 | Hum et al. | 713/100 |
| 2009/0256607 A1 | 10/2009 | Smith et al. | |
| 2009/0271167 A1 | 10/2009 | Zhu et al. | |
| 2010/0064271 A1 | 3/2010 | Chen | |
| 2010/0231044 A1 | 9/2010 | Tatsumi et al. | |
| 2010/0308895 A1 | 12/2010 | Koushanfar et al. | |
| 2011/0205680 A1 | 8/2011 | Kidd et al. | |
| 2011/0314314 A1 | 12/2011 | Sengupta | |
| 2012/0025796 A1 | 2/2012 | Kahn | |
| 2012/0054519 A1 | 3/2012 | Branover et al. | |
| 2012/0105452 A1 | 5/2012 | Diard | |
| 2013/0061237 A1 * | 3/2013 | Zaarur et al. | 718/105 |
| 2013/0091380 A1 * | 4/2013 | Decesaris et al. | 714/11 |
| 2013/0097450 A1 | 4/2013 | Patel | |
| 2013/0158892 A1 | 6/2013 | Heron et al. | |
| 2013/0283277 A1 * | 10/2013 | Cai et al. | 718/102 |
| 2014/0129807 A1 * | 5/2014 | Tannenbaum et al. | 712/221 |
| 2014/0184179 A1 | 7/2014 | Raja et al. | |

OTHER PUBLICATIONS

IEEE Journal of Solid-State Circuits, vol. 42, No. 1, Jan. 2007.

* cited by examiner

PROCESSOR CLUSTER MIGRATION TECHNIQUES

BACKGROUND OF THE INVENTION

Computing systems have made significant contributions toward the advancement of modern society and are utilized in a number of applications to achieve advantageous results. Numerous devices, such as desktop personal computers (PCs), laptop PCs, tablet PCs, netbooks, smart phones, servers, and the like have facilitated increased productivity and reduced costs in communicating and analyzing data in most areas of entertainment, education, business, and science. One common aspect of conventional computing systems is the multi-core processor.

Figure 1:
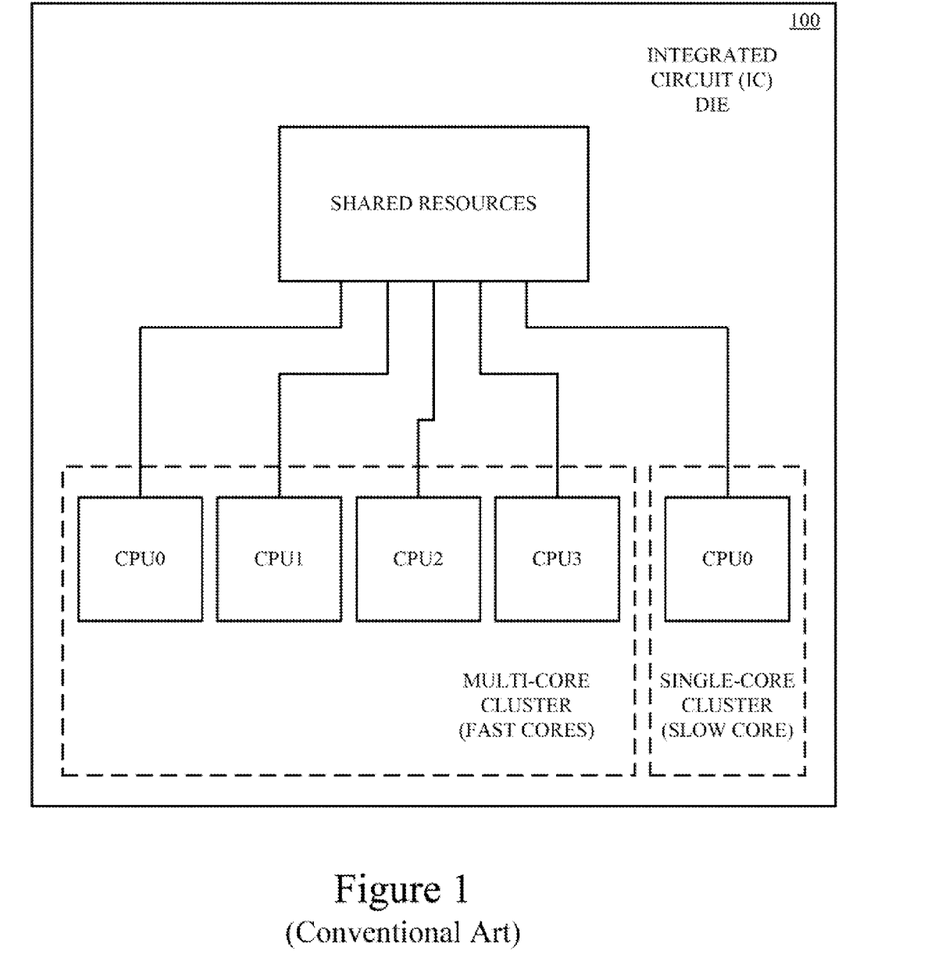
FIG. 1 shows a block diagram of an integrated circuit (IC) having a plurality of processing cores according to the conventional art.

In multi-core processors, one or more of the cores may be selectively turned off to conserve power when the workload can be handled by a lesser number of cores. In some conventional systems, an integrated circuit may include a cluster of two or more high performance cores and a lower performance core as illustrated in FIG. 1. Execution of processes (e.g., thread) may be switched to the lower performance core when the processing performance of even a single high performance core of the cluster is more than necessary. However, in the conventional integrated circuit, execution of the processes is first transferred from the various cores (e.g., f-CPU1/2/3) of the multi-core cluster to a predetermined core (e.g., f-CPU0) of the multi-core cluster. After the processes have been transferred to a predetermined core of the multi-core cluster, the threads are then migrated to the core of the single core cluster. Although performance parameters such as processing speed, utilization, power consumption, and the like are improved on the conventional integrated circuit processor having, the combination of a multi-core cluster and a single core, there is a continuing need to improve the processing performance of integrated circuit processors.

SUMMARY OF THE INVENTION

The present technology may best be understood by referring to the following description and accompanying drawings that are used to illustrate embodiments of the present technology directed toward processor cluster migration techniques.

In one embodiment, an integrated circuit may include a multi-core cluster, a single core cluster, and one or more shared resources. The multi-core cluster includes a plurality of cores; while the single-core cluster includes a single core that is typically referred to as being fabricated in dark silicon of the integrated circuit. The single core is referred to as being fabricated in dark silicon because it is not visible to the operating system. The processing performance of each core of the multi-core cluster is greater than the core of the single core cluster. During operation of the integrated circuit, it is determined whether the processes are executing on a given one of any core of a multi-core cluster and whether the utilization of the given core is predicted to be in a first predetermined range (e.g., below 40%). When the processes are all executing on the given core of the multi-core cluster and utilization of the given core is predicted to be in the first predetermined range, the core of a single-core cluster is power-ungated (e.g., powered on). The context of the one or more processes executing on the given core of the multi-core cluster is also saved when one or more processes are executing on the given core of the multi-core cluster and the utilization of the given core of the multi-core cluster is predicted to be in a predetermined range. One or more shared resources utilized by the given core of the multi-core cluster are re-mapped to the core of the single-core cluster after power-ungating the core of the single-core cluster and saving the context of the one or more processes executing on the given core of the multi-core cluster. Execution of the saved context is restarted on the core of the single-core cluster after re-mapping the one or more shared resources of the given core of the multi-core cluster to the core of the single-core cluster. In addition, the cores of the multi-core cluster are power-gated (e.g., powered off) after saving the context of the one or more processes executing on the given core of the multi-core cluster.

The processes can also be transferred back from the core of the single-core cluster to the given core of the multi-core cluster. In one embodiment, the given core of the multi-core cluster is power-on gated when utilization of the core of the single core cluster is predicted to be in a second predetermined range (e.g., above 80%). The context of the one or more processes executing on the core of the single-core cluster are also saved when utilization of the core of the single core cluster is predicted to be in the second predetermined range. The one or more shared resources utilized by the given core of the multi-core cluster are un-mapped from the core of the single-core cluster after power-ungating the given core of the multi-core cluster and saving the context of the one or more processes executing on the core of the single-core cluster. Execution of the saved context is restarted on the given core of the multi-core cluster after un-mapping the one or more shared resources of the given core of the multi-core cluster from the core of the single-core cluster. The core of the single-core cluster is also power-gated after saving the context of the one or more processes executing on the core of the single-core cluster.

In an alternative embodiment, a request to start one or more other processes on one or more other cores of the multi-core cluster is held off when one or more processes are executing on the core of the single-core cluster. In response to the request to start one or more other processes on the one or more other cores of the multi-core cluster, the given core and one or more other cores of the multi-core cluster is power-ungated. In addition, the context of the one or more process executing on the core of the single-core cluster is saved in response to the request to start one or more other processes on the one or more other cores of the multi-core cluster. The one or more shared resources utilized by the given core of the multi-core cluster are un-mapped from the core of the single-core cluster after power-un gating the given core of the multi-core cluster and saving the context of the one or more processes executing on the core of the single-core cluster. Execution of the saved context is restarted on the given core of the multi-core cluster after un-mapping one or more resources from the core of the single-core cluster. Execution of the one or more other processes on the one or more other cores of the multi-core cluster is also started after un-mapping the one or more shared resources from the core of the single-core cluster. In addition, the core of the single-core cluster is power-gated after saving the context of the one or more processes executing on the core of the single-core cluster.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

BRIEF DESCRIPTION OF THE DRAWINGS

Embodiments of the present technology are illustrated by way of example and not by way of limitation, in the figures of the accompanying drawings and in which like reference numerals refer to similar elements and in which.

DETAILED DESCRIPTION OF THE INVENTION

Reference will now be made in detail to the embodiments of the present technology, examples of which are illustrated in the accompanying drawings. While the present technology will be described in conjunction with these embodiments, it will be understood that they are not intended to limit the invention to these embodiments. On the contrary, the invention is intended to cover alternatives, modifications and equivalents, which may be included within the scope of the invention as defined by the appended claims. Furthermore, in the following detailed description of the present technology, numerous specific details are set forth in order to provide a thorough understanding of the present technology. However, it is understood that the present technology may be practiced without these specific details. In other instances, well-known methods, procedures, components, and circuits have not been described in detail as not to unnecessarily obscure aspects of the present technology.

Some embodiments of the present technology which follow are presented in terms of routines, modules, logic blocks, and other symbolic representations of operations on data within one or more electronic devices. The descriptions and representations are the means used by those skilled in the art to most effectively convey the substance of their work to others skilled in the art. A routine, module, logic block and/or the like, is herein, and generally, conceived to be a self-consistent sequence of processes or instructions leading to a desired result. The processes are those including physical manipulations of physical quantities. Usually, though not necessarily, these physical manipulations take the form of electric or magnetic signals capable of being stored, transferred, compared and otherwise manipulated in an electronic device. For reasons of convenience, and with reference to common usage, these signals are referred to as data, bits, values, elements, symbols, characters, terms, numbers, strings, and/or the like with reference to embodiments of the present technology.

It should be borne in mind, however, that all of these terms are to be interpreted as referencing physical manipulations and quantities and are merely convenient labels and are to be interpreted further in view of terms commonly used in the art. Unless specifically stated otherwise as apparent from the following discussion, it is understood that through discussions of the present technology, discussions utilizing the terms such as "receiving," and/or the like, refer to the actions and processes of an electronic device such as an electronic computing device, that manipulates and transforms data. The data is represented as physical (e.g., electronic) quantities within the electronic device's logic circuits, registers. memories and/or the like, and is transformed into other data similarly represented as physical quantities within the electronic device.

Figure 4:
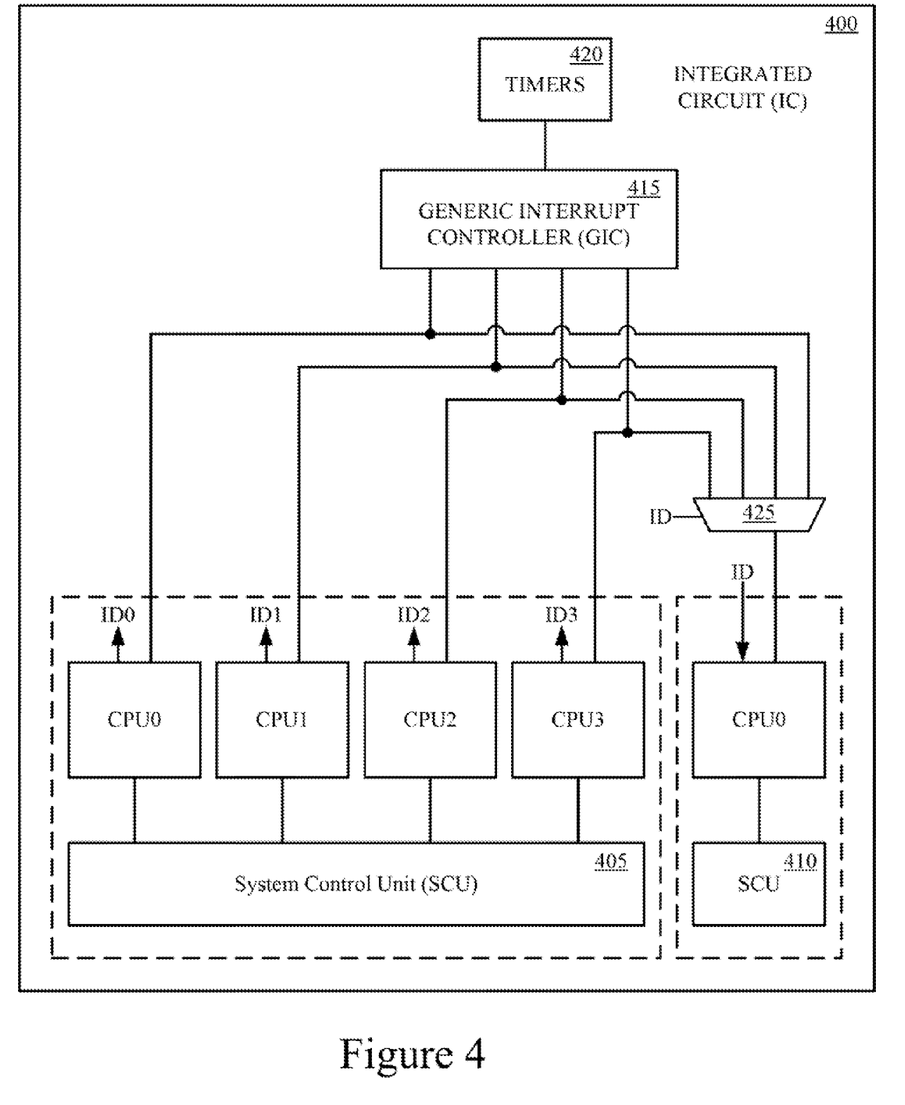
FIG. 4 shows a block diagram of an integrated circuit (IC) having a plurality of processing cores in accordance with another embodiment of the present technology.

In this application, the use of the disjunctive is intended to include the conjunctive. The use of definite or indefinite articles is not intended to indicate cardinality. In particular, a reference to "the" object or "a" object is intended to denote also one of a possible plurality of such objects. It is also to he understood that the phraseology and terminology used herein is for the purpose of description and should. not be regarded as Referring, now to FIG. 2, an integrated circuit (IC) in accordance with one embodiment of the present technology is shown. The integrated circuit 200 includes a multi-core cluster 205 of processing cores, a single-core cluster 210 and shared resources 215 fabricated in a system-on-a-chip (SoC). The multi-core cluster 205 includes a plurality of processing units 220-235, such as central processing units (CPUs), graphics processing units (GPUs), digital signal processors (DSPs) or the like. The single core 240 of the single-core cluster 210 is a similar processing unit, but generally delivers lower processing performance as compare to the cores in the multi-core cluster. As illustrated in FIG. 4, the shared resources 415 may include one or more system control units (SCUs) 405, 410, one or more interrupt controllers 415, one or more timers 420, power management unit (PMU), and other control logic 425. The one or more shared resources may be resources common to the cores of the multi-core cluster, single core cluster or both. One or more resources may also be pooled between multiple cores or specific to a corresponding core. The shared resources may be implemented in hardware, firmware, computing device-executable instructions (e.g., software) that are stored in computing device-readable media (e.g., computer memory) and executed by a computing device (e.g., processor) or any combination thereof.

In an exemplary implementation, the multi-core cluster is a quad-core cluster (f-cluster) and the single core (s-cluster) is a shadow processor added as 'dark' silicon to the system-on-a-chip (SoC). The high performance quad-core cluster (f-duster) is typically not performance-per-watt (energy) efficient, compared to the single core (s-cluster) for low performance use cases. When the work-load running on the multi-core cluster (f-cluster) is reduced such that one or more performance parameters, such as energy consumption, cannot be met on the multi-core cluster, the processes executing on the last core of the multi-core cluster may be migrated to the core of the single-core cluster (s-cluster), Conversely, when the workload increases such that one or more performance parameters, such as throughput, cannot be met by the core of the single-core cluster (s-cluster), the workload is migrated from the core of the single core (s-cluster) to the original core of the multi-core cluster (f-cluster) from which it came. The workload may be migrated from any core (f-CPU0/1/2/3) of the multi-core cluster (f-cluster) to the core of the single core (s-cluster), without first having to transfer the processes to a predetermined core (f-CPU0) of the multi-core cluster and then idling the other cores (f-CPU1/2/3). Furthermore the workload may be migrated from any core (f-CPU0/1/2/3) of the multi-core cluster (f-cluster) to the single core (s-cluster), without software virtualization (hypervisor) support which is characterized by substantial processing overhead.

Operation of the integrated circuit will be further explained with reference to FIG. 3A-3E, which illustrated a method of migrating processes from the multi-core cluster to the single-core cluster and back again, in accordance with one embodiment of the present technology. The method may be implemented in hardware, firmware, as computing device-executable instructions (e.g., software) that are stored in computing device-readable media (e.g., computer memory) and executed by a computing device (e.g., processor) or any combination thereof. It is appreciated that the method of migrating processes from the multi-core cluster to the single core and back again may also include other processes in addition to those shown in the figures and described below. It is also appreciated that the order of the processes may vary from those shown in the figures. For example, one or more sets of processes that are shown in the figures to be performed sequentially may be performed in The method begins with various processes (e.g., threads) executing on one or more cores of the multi-core cluster, at 305. In one implementation, the processes are initialized to start executing on the core of the multi-core cluster. At 310, a determination is made that the processes are executing on any given one (e.g., CPU2) of the cores of the multi-core cluster and that the utilization of the given core is predicted to be in a first predetermined range (e.g., less than 40%). In one implementation, one or more shared resources, such as a system control unit (SCU), power management unit or the like, receives hints from the operating system (OS) indicating idle time of the given core. In one implementation, the hints may be the pending instructions scheduled for execution by the given core. The share resource may also predict the utilization from past execution history, or the combination of pending instruction scheduling and past execution history.

Figure 2:
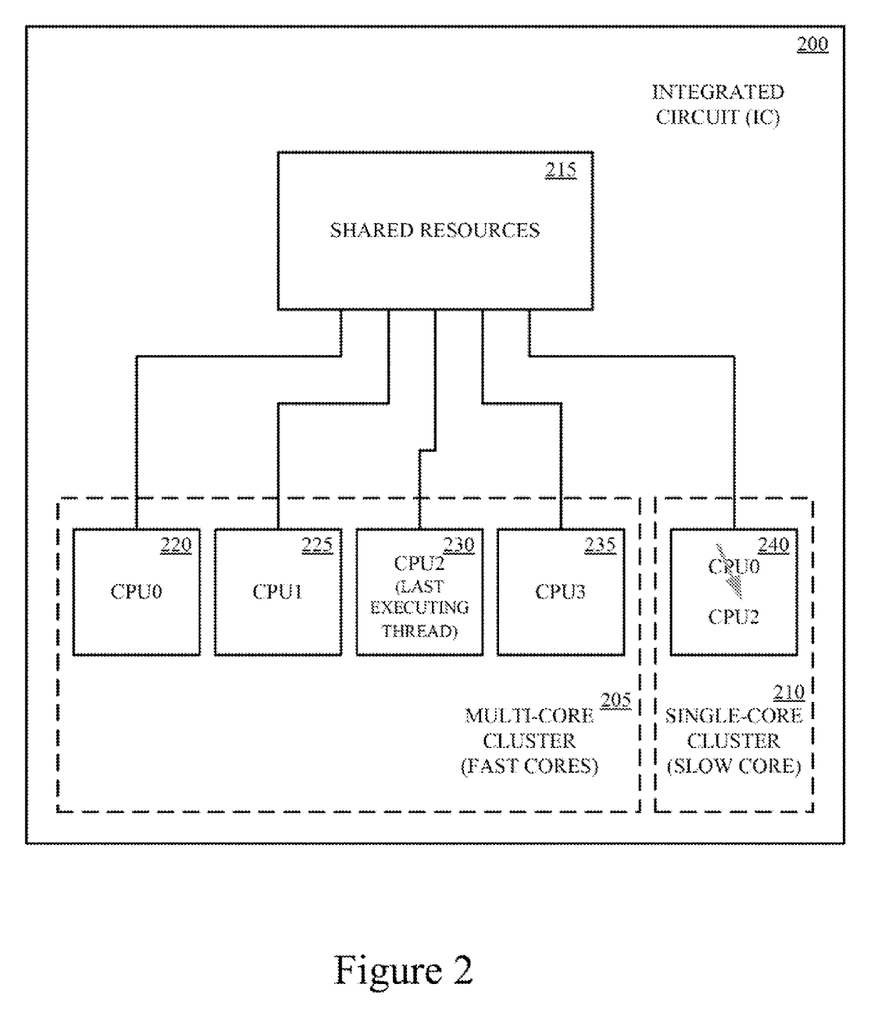
FIG. 2 shows a block diagram of an integrated circuit (IC) having, a plurality of processing cores in accordance with one embodiment of the present technology.
Figure 3A:
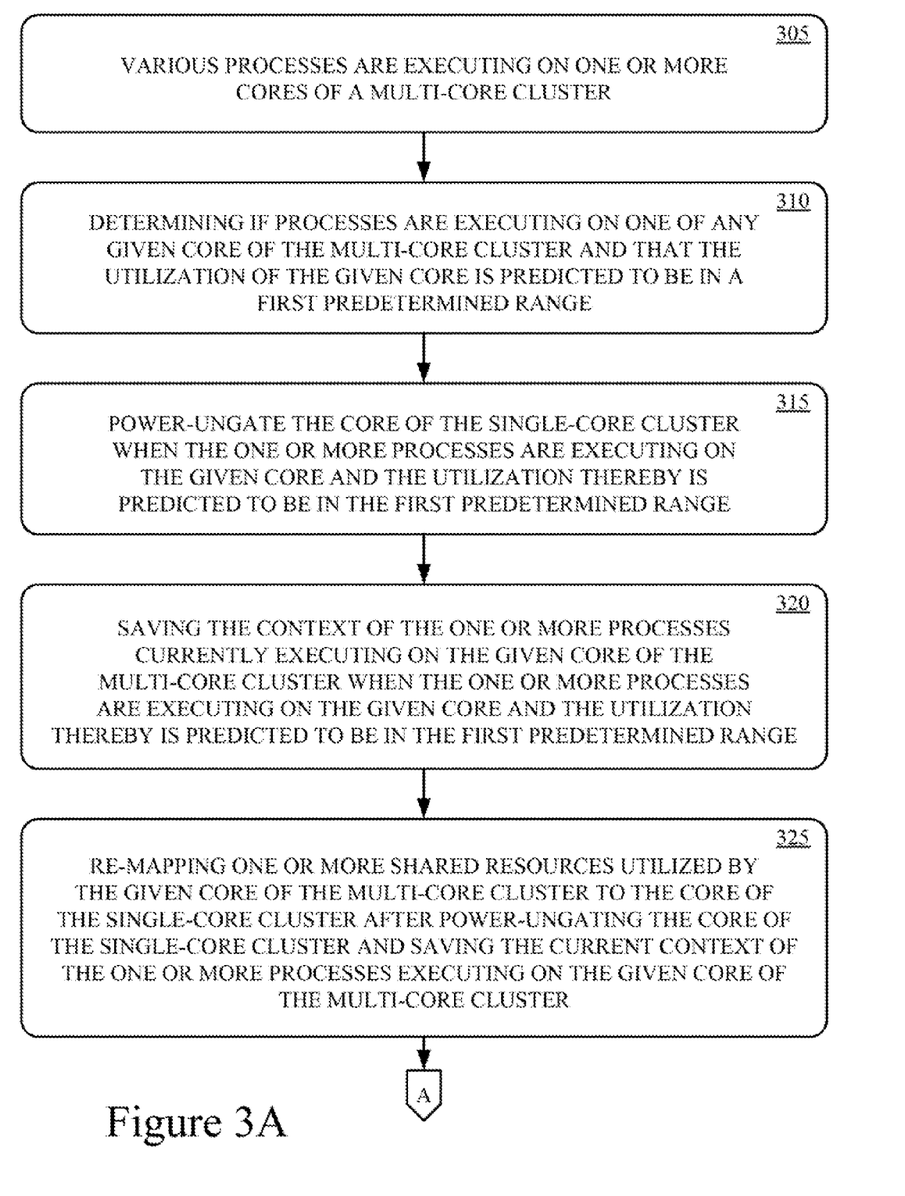
FIGS. 3A-3E show a flow diagram of a method of migrating process from the multi-core cluster to the single-core cluster and back again, in accordance with one embodiment of the present technology.
Figure 3B:
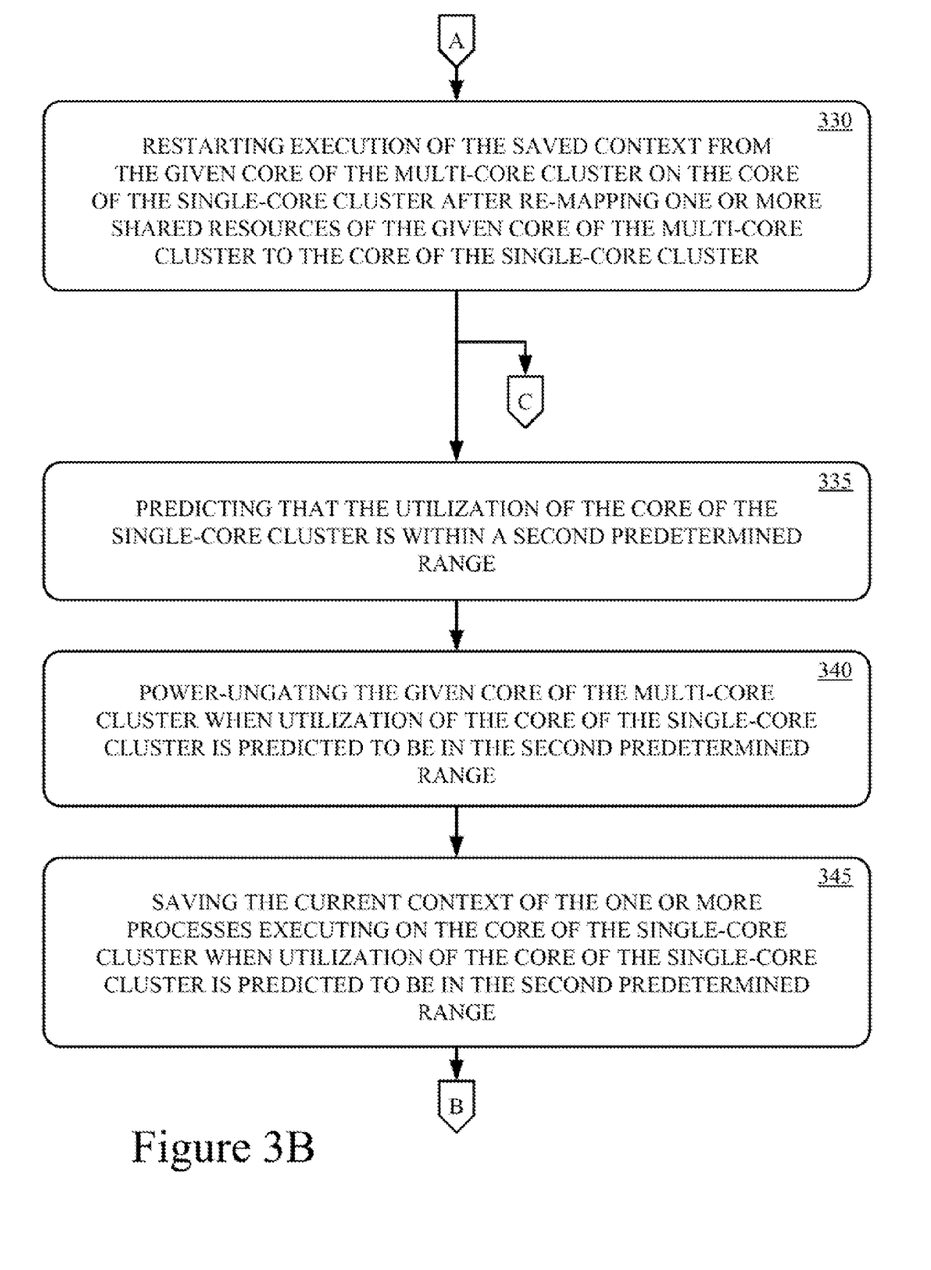
Figure 3C:
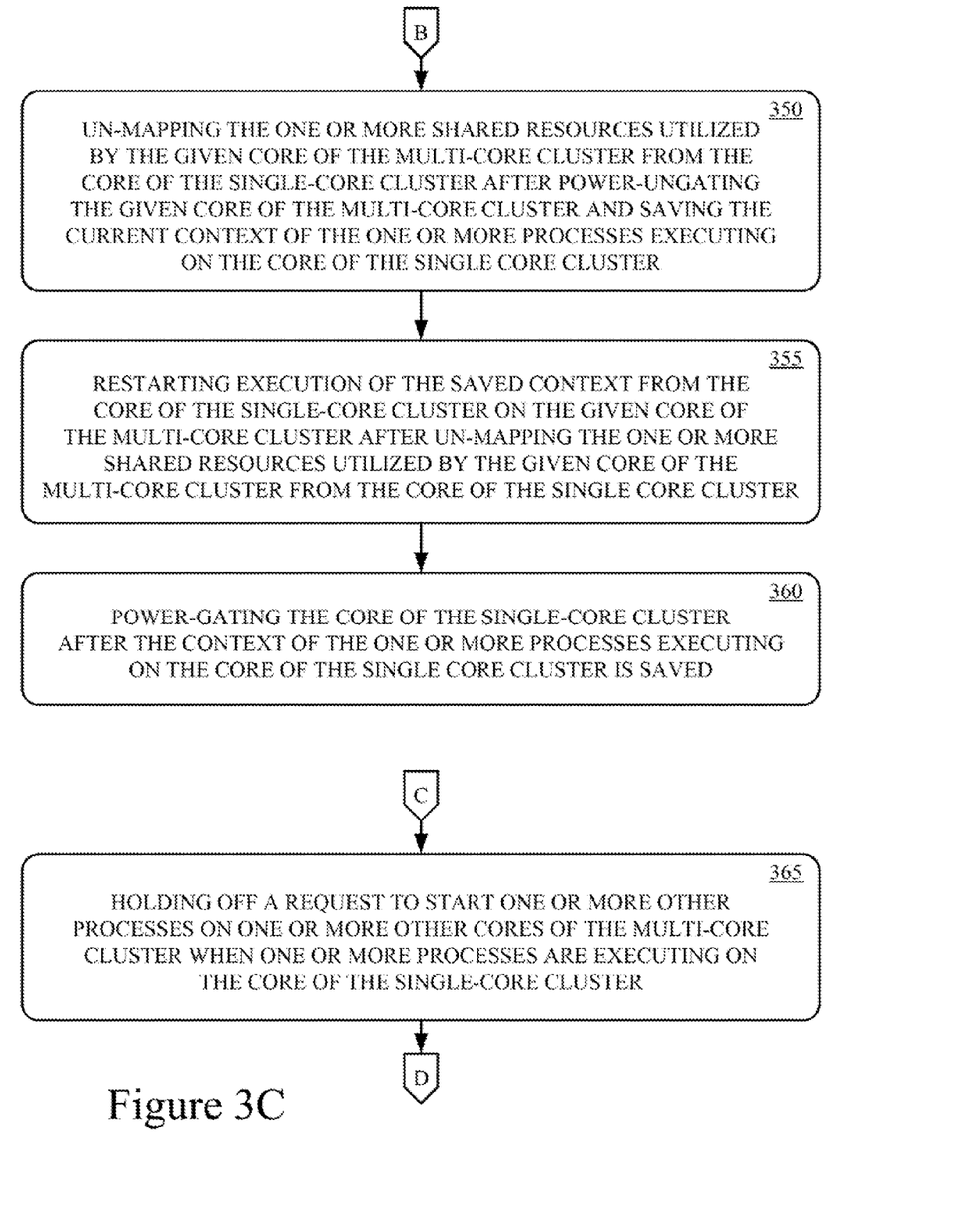
Figure 3D:
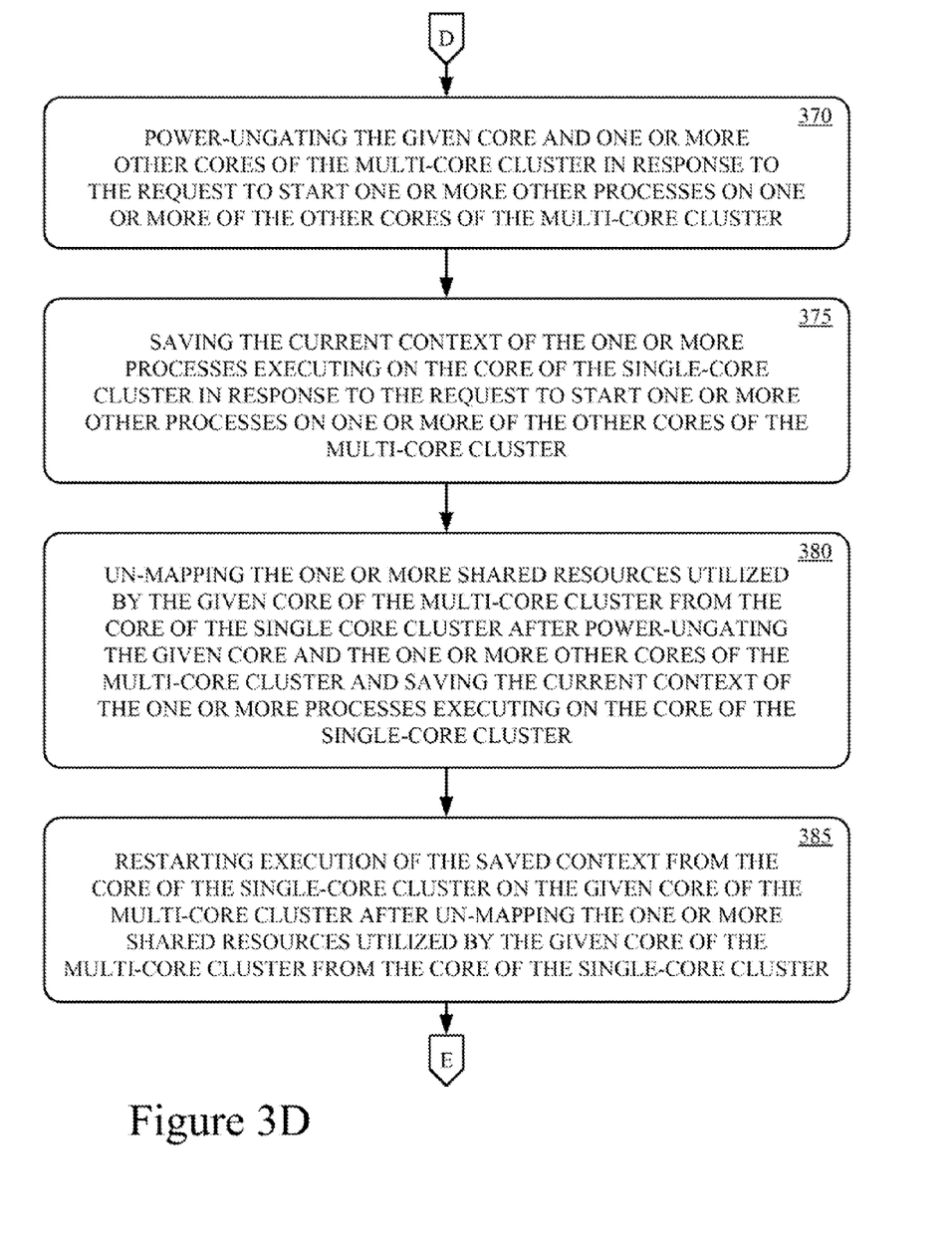
Figure 3E:
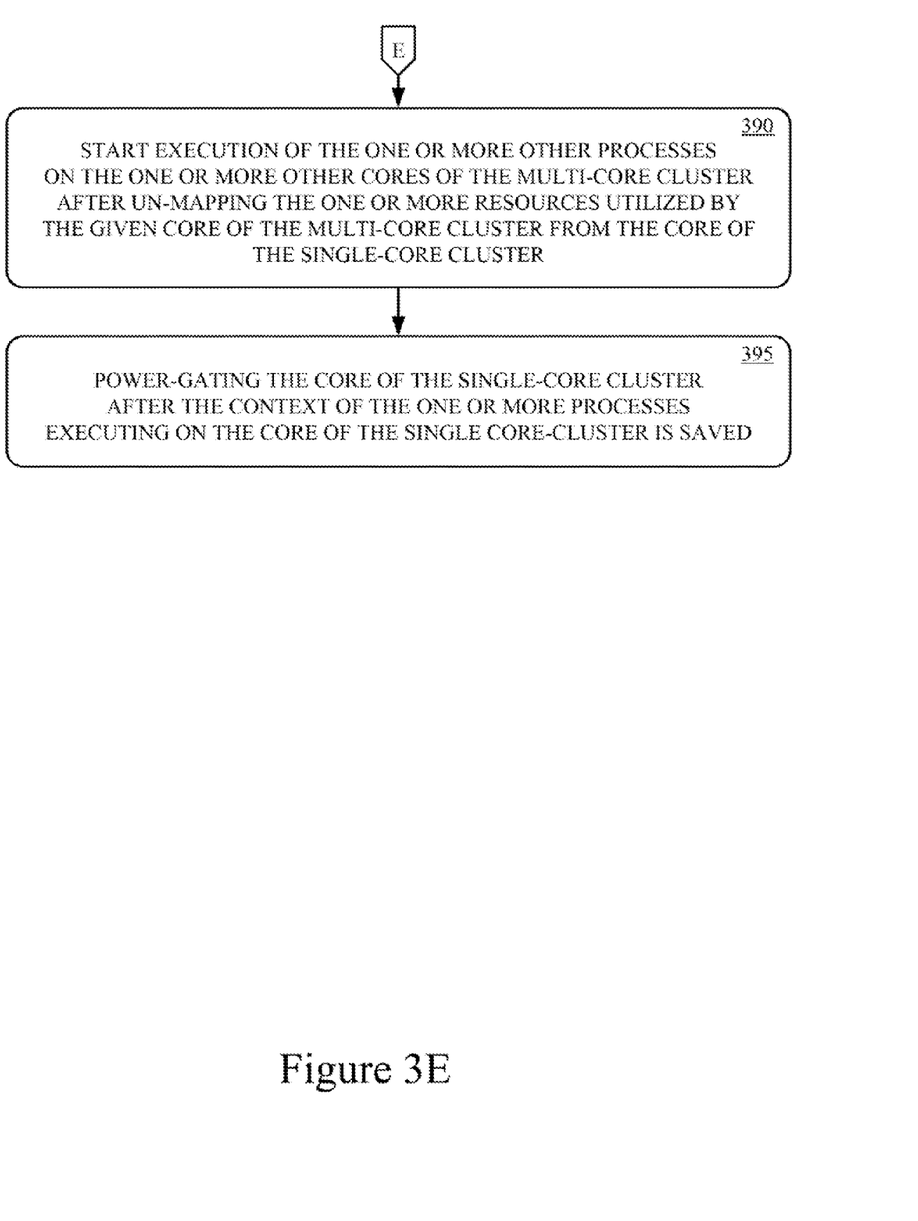

At 315, the core of the single-core cluster is power-ungated when the one or more processes are executing on the given core of the multi-core cluster and the utilization thereby is predicted to be in the first predetermined range. In one implementation, one or more shared resources, such as a power management unit (PMU), turns power on to the single-core cluster. At 320, the context of the one or more processes currently executing on the given core of the multi-core cluster is saved when the one or more processes are executing on the given core and the utilization thereby is predicted to be in the first predetermined range. In one implementation, one Or more shared resources, such as the system control unit (SCU) of the multi-core cluster, cause execution of the one or more processes to pause and the context thereof to be saved in a computing device readable medium e.g., random access memory (RAM)) accessible by the multi-core and single-core clusters. At 325, one or more shared resources utilized by the given core of the multi-core cluster are re-mapped to the core of the single-core cluster after power-ungating the core of the single core cluster and saving the context of the one or more processes currently executing on the given core of the multi-core cluster. Re-mapping the shared resources includes emulating the identity of the given core of the multi-core cluster by the core of the single core-cluster. In one implementation, one or more shared resources, such as one or more system control units and control logic (e.g., multiplexor), re-map one or more shared resources, such as one or more generic interrupt controllers and one or more timers, to the core of the single-core cluster. In one implementation, a device identifier of the core of the single-core cluster is programmed with the device identifier of the given core of the multi-core cluster as illustrated in FIG. 2. The device identifier is also utilized to cluster switch control signals from one or more timers, one or more generic interrupt controllers, and the like utilized by the given core of the multi-core cluster to the core of the single-core cluster. The context of the one or more processes executing on the given core of the multi-core cluster is stored and the one or more shared resources utilized by the given core of the multi-core cluster may he re-mapped to the core of the single-core cluster during an idle period of the one or more processes executing on the given core of the multi-core cluster.

At 330, execution of the saved context from the given core of the multi-core cluster is restarted on the core of the single-core cluster after re-mapping the one or more shared resources of the given core to the core of the single-core cluster. In one implementation, one or more shared resources, such as the system control unit (SCU) for the single-core cluster, causes the core of the single-core cluster to execute a reset vector that points to the saved context. The saved context is loaded and execution of the one or more processes resumes. Thereafter, the one or more processes (e.g., threads) continue execution on the single core of the single core cluster.

At 335, at some point during execution of one or more processes on the single core of the single core cluster, the utilization of the core of the single-core cluster may be predicted to be in a second predetermined range (e.g., 80% or more), in one implementation, a shared resource, such as a system control unit (SCU). power management unit or the like, receives hints from the operating system (OS) indicating utilization of the given core. In one implementation, the hint may be the pending instructions scheduled for execution. The share resource may also predict the utilization from past execution history, or the combination of pending instruction scheduling and past execution history.

At 340, the given core of the multi-core cluster is power-ungated when utilization of the core of the single-core cluster is predicted to be in the second predetermined range. In one implementation, one or more shared resources, such as a power management unit (PMU), turns power on to the given core of the multi-core cluster. At 345, the current context of the one or more processes executing on the core of the single-core cluster is saved when utilization of the core of the single-core cluster is predicted to be in the second predetermined range. In one implementation, one or more shared resources, such as the system control unit (SCU) of the single-core cluster, cause execution of the one or more processes to pause and the context thereof to be saved in a computing device readable medium (e.g., random access memory (RAM)) accessible by the multi-core and single-core dusters. At 350, the one or more shared resources utilized by the given core of the multi-core cluster are un-mapped from the core of the single-core cluster after power-ungating the given core of the multi-core cluster and saving the current context of the one or more processes executing on the core of the single-core cluster. In one implementation, one or more shared resources, such as one or more system control units and control logic (e.g., multiplexor), un-map one or more shared resources, such as one or more generic interrupt controllers and one or more tuners, from the core of the single-core cluster hack to the given core of the multi-core cluster.

At 355, execution of the saved context from the core of the single-core cluster is restarted on the given core of the multi-core cluster after un-mapping the one or more shared resources utilized by the given core of the multi-core cluster from the core of the single-core cluster. In one implementation, one or more shared resources, such as the system control unit (SCU) for the multi-core cluster, causes the given core of the multi-core cluster to execute a reset vector that points to the saved context to restart execution of the on or more processes. Accordingly, execution is migrated from the core of the single-core cluster (e.g., slow core) hack to the corresponding core of the multi-core cluster (e.g., given fast core) when utilization on the core of the single-core cluster reaches or exceeds a predetermined threshold, such as 80% utilization. Thereafter, the one or more processes (e.g., threads) continue execution on the given core of the multi-core cluster. At 360, the core of the single core cluster is power-gated after the context of the one or more processes executing on the core of the single-core cluster is saved.

At 365, a request to start one or more other processes on one or more other cores of the multi-core cluster is held off when one or more processes are executing on the core of the single-core cluster. in one implementation, the request may be an inter-process interrupt (IPI) to wake one or more other cores of the multi-core cluster. At 370, the given core and one or more other cores of the multi-core cluster are power-ungated in response to the request to start one or more other processes on one or more of the other cores of the multi-core cluster, In one implementation, one or more shared resources, such as the system control unit (SCU) or generic interrupt controller (GIC), holds the request: off (e.g., IPI), until one or more other shared resources, such as the power management unit turns the applicable cores of the multi-core cluster back on. At 375, the current context of the one or more processes executing on the core of the single-core cluster is saved in response to the request to start one or more other processes on one or more other cores of the multi-core cluster. In one implementation, one or more shared resources, such as the system control unit (SCU) of the single-core cluster, cause execution of the one or more processes to pause and the context. thereof to be saved in a computing device readable medium (e.g., random access memory (RAM)) accessible by the multi-core and single-core clusters. At 380, the one or more resources utilized by the given core of the multi-core cluster are un-mapped from the core of the single-core cluster after power-ungating the given core and the one or more other cores of the multi-core cluster and saving the current context of the one or more processes executing on the core of the single-core cluster. In one implementation, one or more shared resources, such as one or more system control units and control logic (e.g., multiplexor), un-map one or more shared resources, such as one or more generic interrupt controllers and one or more timers, from the core of the single-core cluster back to the given core of the multi-core cluster.

At 385, execution of the saved context from the core of the single-core cluster is restarted on the given core of the multi-core cluster after un-mapping the one or more resources utilized by the given core of the multi-core cluster from the core of the single-core cluster. In one implementation, one or more shared resources, such as the system control unit (SCU) for the multi-core cluster, causes the given core of the multi-core cluster to execute a reset vector that points to the saved context to restart execution of the one or more processes. At 390, execution of the one or more other processes are started on the one or more other cores of the multi-core cluster after un-mapping the one or more resources utilized by the given core of the multi-core cluster from the core of the single-core cluster. Thereafter the processes (e.g., threads) continue execution on the cores of the multi-core cluster. At 395, the core of the single core cluster is power-gated after the context of the one or more processes executing on the core of the single-core cluster is saved. The processes of 305-395 maybe repeated as may be applicable.

Accordingly, the single-core cluster is decoupled from the fixed per core physical hardware resources, such as CPU-ID, interrupts, timers and/or the like, which are coupled to the single-core cluster (CPU0). Instead, the hardware resources are dynamically mapped, before migration, to the single-core cluster based on the given multi-core cluster resources which would be migrated to the single-core cluster. The core identifier of the single-core cluster is virtualized so that the software e.g., operating system) view of the core identifier does not change when migrating between cores. In one implementation, the identifier (MPID) of any one of the cores of the multi-core cluster is written (e.g., input port) into a device identifier register (e.g., CPUID) of the single-core cluster. The CPUID of the single core cluster is configured with the appropriate CPUID when the single-core cluster is in reset. Similarly, the interface between the cores and the generic interrupt controller (GIC) is also virtualized so that the software (e.g., OS) view does not change. The context of the one or more processes executing on the given core of the multi-core cluster, re-mapping the one or more shared resources utilized by the given core of the multi-core cluster to the core of the single-core cluster, and restarting execution of the saved context on the core of the single-core cluster is performed underneath an operating system.

Techniques, therefore, advantageously provide for migrating execution of processes (e.g., threads) that are execution on any single core of the multi-core cluster to the core of the single-core cluster and back again. The techniques advantageously do not utilize software virtualization to implement the migrations between the cores of the multi-core cluster and the core of the single-core cluster.

The foregoing descriptions of Specific embodiments of the present technology have been presented for purposes of illustration and description. They are not intended to be exhaustive or to limit the invention to the precise forms disclosed, and obviously many modifications and variations are possible in light of the above teaching. The embodiments were chosen and described in order to best explain the principles of the present technology and its practical application, to thereby enable others skilled in the art to best utilize the present technology and various embodiments with various modifications as are suited to the particular use contemplated. It is intended that the scope of the invention be defined by the claims appended hereto and their equivalents.

What is claimed is:

1. A method comprising;

power-ungating a core of a single-core cluster, when one or more processes are executing on a given one of any core of the multi-core cluster and utilization of the given core is predicted to be in a first predetermined range, wherein processing performance of each core of the multi-core cluster is greater than the core of the single core cluster;

saving a context of the one or more processes executing on the given core of the multi-core cluster when the one or more processes are executing on the given core of the multi-core cluster and the utilization of the given core of the multi-core cluster is predicted to be in the first predetermined range;

re-mapping one or more shared resources utilized by the given core of the multi-core cluster to the core of the single-core cluster, including emulating the identity of the given core of the multi-core cluster by the core of the single core-cluster, after power-ungating the core of the single-core cluster and saving, the context of the one or more processes executing on the given core of the multi-core cluster, wherein the shared resources are common to the multi-core cluster and the single-core cluster, and the multi-core cluster, single-core cluster and shared resources are fabricated together on an integrated circuit die;

restarting execution of the saved context on the core of the single-core cluster after re-mapping the one or more ;hared resources of the given core of the multi-core cluster to the core of the single-core cluster; and power-gating the cores of the multi-core cluster after saving the context of the one or more processes executing on the given core of the multi-core cluster.

2. The method of claim 1, wherein the context of the one or more processes executing on the given core of the multi-core cluster is stored and the one or more shared resources utilized by the given core of the multi-core cluster are re-mapped to the core of the single-core cluster during an idle period of the one or more processes executing on the given core of the multi-core cluster.

3. The method of claim 1, wherein saving the context of the one or more processes executing on the given core of the multi-core cluster, re-mapping the one or more shared resources utilized by the given core of the multi-core cluster to the core of the single-core cluster, and restarting execution of the saved context on the core of the single-core cluster is performed underneath an operating system.

4. The method of claim 1, wherein utilization of the given core is predicted from past execution history on the given core of the multi-core cluster.

5. The method of claim 1, wherein utilization of the given core is predicted from pending scheduling on the given core of the multi-core cluster.

6. The method of claim 1, wherein utilization of the given core is predicted from past execution history and pending scheduling on the given core of the multi-core cluster.

7. The method of claim 1, wherein re-mapping one or more shared resources utilized by the given core of the multi-core cluster to the core of the single-core cluster comprises changing an identifier of the core of the single-core cluster to an identifier of the given core of the multi-core cluster.

8. The method of claim 7, wherein re-mapping the one or more shared resources utilized by the given core of the multi-core cluster to the core of the single-core cluster comprises multiplexing the one or more shared resourced to the core of the single-core cluster based upon the changed identifier of the single-core cluster.

9. The method of claim 1, wherein the one or more shared resources are selected from a group consisting of one or more timers, and one or more interrupts.

10. The method of claim 1, further comprising:
holding off a request to start one or more other processes on one or more other cores of the multi-core cluster, when one or more processes are executing on the core of the single-core cluster;

power-ungating the given core and the one or more other cores of the multi-core cluster in response to the request to start the one or more other processes on the one or more other cores of the multi-core cluster;

saving the context of the one or more processes executing on the core of the single-core cluster in response to the request to start the one or more other processes on the one or more other cores of the multi-core cluster;

un-mapping the one or more shared resources utilized by the given core of the multi-core cluster from the core of the single-core cluster alter power-ungating the given core of themulti-core cluster and saving the context of the one or more processes executing on the core of the single-core cluster;

restarting execution of the saved context, of the one or more processes that were executing on the core of the single-core cluster, on the given core of the multi-core cluster after un-mapping the one or more shared resources utilized by the given core of the multi-core cluster from the core of the single-core cluster;

starting execution of the one or more other processes on the one or more other cores of the multi-core cluster after un-mapping the one or more shared resources of the given core of the multi-core cluster from the core of the single-core cluster; and power-gating the core of the single-core cluster after saving the context of the one or more process executing on the core of the single-core cluster.

11. The method of claim 10, wherein holding off a request to start the one or more other processes on one or more other cores of the multi-core cluster comprises holding off an inter-process interrupt (IPI) requesting to start the one or more other processes on the one or more other of the cores of the multi-core cluster.

12. The method of claim 10, wherein restarting execution of the saved context, of the one or more processes that were executing on the core of the single-core cluster, on the given core of the multi-core cluster comprises executing a reset vector pointing to the saved context by the given core of the multi-core cluster.

13. The method of claim 1, further comprising:
power-ungating the given core of the multi-core cluster when utilization of the core of the single core cluster is predicted to be in a second predetermined range;

saving the context of the one or more processes executing on the core of the single-core cluster when utilization of the core of the single core cluster is predicted to be in the second predetermined range;

un-mapping the one or more resources utilized by the given core of the multi-core cluster from the core of the single-core cluster after power-ungating the given core of the multi-core cluster and saving the context of the one or more processes executing on the core of the single-core cluster;

restarting execution of the saved context, of the one or more processes that were executing on the core of the single-core cluster, on the given core of the multi-core cluster after un-mapping the one or more resources of the given core of the multi-core cluster from the core of the single-core cluster; and power-gating the core of the single-core cluster after saving the context of the one or more processes executing, on the core of the single-core cluster.

14. An apparatus comprising:
a means for determining if processes are executing on a given one of any core of a multi-core cluster and that the Utilization of the given tore is predicted to be in a first predetermined range;

a means for power-on gating a core of a single-core cluster, when one or more processes are executing on the given core of the multi-core cluster and utilization of the given core is predicted to be in the first predetermined range, wherein processing performance of each core of the multi-core cluster is greater than the core of the single core cluster;

a means for saving a context of the one or more processes executing on the given core of the multi-core cluster when one or more processes are executing on the given core of the multi- core cluster and the utilization of the given core of the multi-core cluster is predicted to be in a predetermined range;

a means for cluster switching one or more shared resources utilized by the given core of the multi-core cluster to the core of the single-core cluster, including emulating the identity of the given core of the multi-core cluster by the core of the single core-cluster, after power-ungating the core of the single-core cluster and saving the context of the one or more processes executing on the given core of the multi-core cluster, wherein the shared resources are common to the multi-core cluster and the single-core cluster, wherein the multi-core cluster, single-core cluster and shared resources are fabricated together on a system-on-a-chip (SoC);

a means for restarting execution of the saved context on the core or the single-core cluster after re-mapping the one or more shared resources of the given core of the multi-core cluster to the core of the single-core cluster; and a means for power-off gating the cores of the multi-core cluster after saving the context of the one or more processes executing on the given core of the multi-core cluster.

15. The apparatus according to claim 14, farther comprising:

a means for predicting that the utilization of the core of the single-core cluster is within a second predetermined range;

a means for power-ungating the given core of the multi-core cluster when utilization of the core of the single core cluster is predicted to he in a second predetermined range;

means for saving the context of the one or more processes executing on the core of the single-core cluster when utilization of the core of the single core cluster is predicted to be in the second predetermined range;

a means for cluster switching the one or more shared resources utilized by the given core of the multi-core cluster from the core of the single-core cluster after power-ungating the given core of the multi-core cluster and saving the context of the one or more processes executing on the core of the single-core cluster;

a means for restarting execution of the saved context on the given core of the multi-core cluster after cluster switching the one or more shared resources to the given core of the multi-core cluster from the core of the single-core cluster; and a means for power-gating the core of the single-core cluster after saving the context of the one or more processes executing on the core of the single-core cluster.

16. The apparatus according to claim 14, further comprising:

a means for holding off a request to start one or more other processes on one or more other cores of the multi-core cluster when one or more processes are executing on the core of the single-core cluster;

a means for power-ungating the given core and one or more other cores of the multi-core cluster in response to the request to start one or more other processes on the one or more other cores of the multi-core cluster;

a means for saving the context of the one or more process executing on the core of the single-core cluster in response to the request to start one or more other processes on the one or more other cores of the multi-core cluster;

a means for cluster switching the one or more shared resources utilized by the given core of the multi-core cluster from the core of the single-core cluster after power-ungating the given core of the multi-core cluster and saving the context of the one or more processes executing on the core of the single-core cluster;

a means for restarting execution of the saved context on the given core of the multi-core cluster after un-mapping one or more resources of the given core of the multi-core cluster from the core of the single-core cluster;

a means for starting, execution of the one or more other processes on the one or more other cores of the multi-core cluster after cluster switching the one or more shared resources to the given core of the multi-core cluster from the core of the single-core cluster; and a means for power-gating the core of the single-core cluster after saving the context of the one or more processes executing on the core of the single-core cluster.

17. The system according to claim 14, wherein the means of power gating, saving contexts, cluster switching and restarting execution of saved contexts does not utilize software virtualization.

18. The system according to claim 14, wherein the means for cluster switching the one or more shared resources utilized by the given core of the multi-core cluster to the core of the single-core cluster is based upon an identifier of the given core of the multi-core cluster.

19. The system according to claim 14, a means for changing an identifier of the single core of the single-core cluster to the identifier of the given core of the multi-core cluster.

20. The system according to claim 14, wherein the one or more shared resources are selected from a group consisting of one or more timers, and one or more interrupts.

* * * * *